April 22, 1969     F. M. POTTER     3,440,461
OIL-COOLED GENERATORS

Filed Sept. 20, 1966     Sheet _1_ of 2

INVENTOR.
FREDERICK M. POTTER
BY *James M Nichols*

ATTORNEY

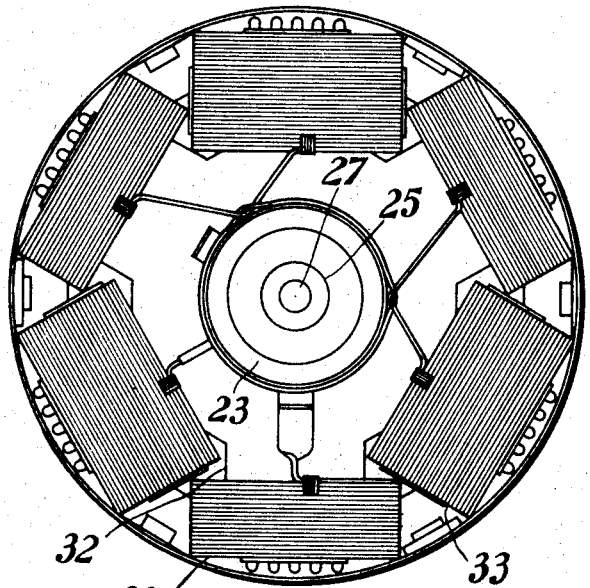
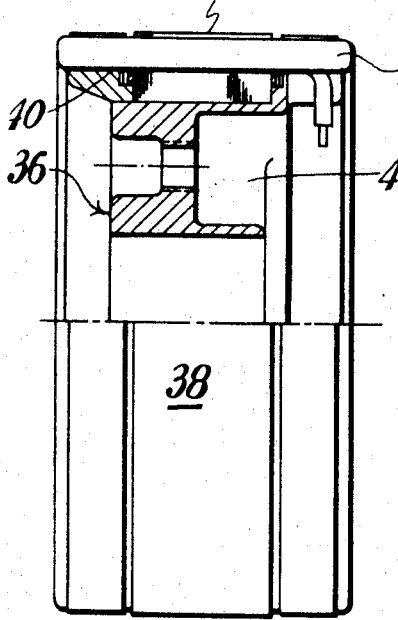
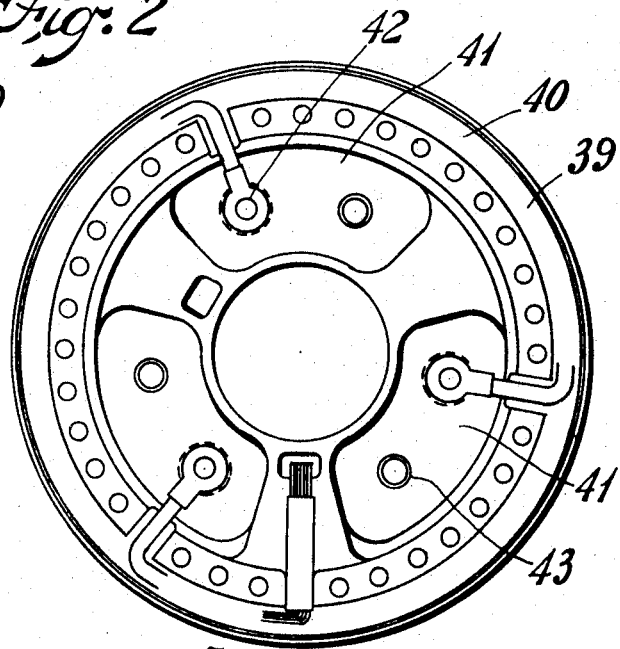

United States Patent Office 3,440,461
Patented Apr. 22, 1969

3,440,461
OIL-COOLED GENERATORS
Frederick Milton Potter, Little Silver, N.J., assignor to The Bendix Corporation, Eatontown, N.J., a corporation of Delaware
Filed Sept. 20, 1966, Ser. No. 580,648
Int. Cl. H02k 9/00, 1/20, 1/32
U.S. Cl. 310—54         6 Claims

ABSTRACT OF THE DISCLOSURE

A liquid-cooled generator having fluid conducting channels in the rotor and stator for cooling the generator. A heat exchange member is positioned in intimate contact with the stator winding to conduct heat from the stator winding to the fluid. A pair of heat exchange members also are mounted on the rotor in intimate contact with the end turns of the rotor winding to conduct heat from the rotor winding to the fluid.

---

The present invention relates to dynamoelectric machines and more particularly to a liquid-cooled machine. It relates to improvements in an oil-cooled generator design as described and claimed in U.S. Patent 3,260,872 which issued on July 12, 1966.

Certain environments in which generators have to operate create problems in providing adequate cooling. It is necessary that means be provided for removing heat generated in the windings, otherwise the machine would be damaged by the high temperature.

The present invention provides a fluid-cooled machine in which novel means are utilized to remove the heat from the windings and transfer it to the cooling fluid.

It is an object of the invention to provide an improved dynamoelectric machine.

Another object of the invention is to provide improved means for removing the heat from windings in a dynamoelectric machine.

Another object of the invention is to provide an improved oil-cooled generator.

A further object of the invention is to provide an improved arrangement for a brushless generator.

The above and other objects and features of the invention will appear more fully hereinafter from a consideration of the following description taken in connection with the accompanying drawings wherein one embodiment is illustrated by way of example.

In the drawings:

FIGURE 2 is an end view of the main rotor in the machine of FIGURE 1.

FIGURE 3 is a partial cutaway view of the exciter rotor of FIGURE 1.

FIGURE 4 is an end view of the exciter rotor.

Figure 1:
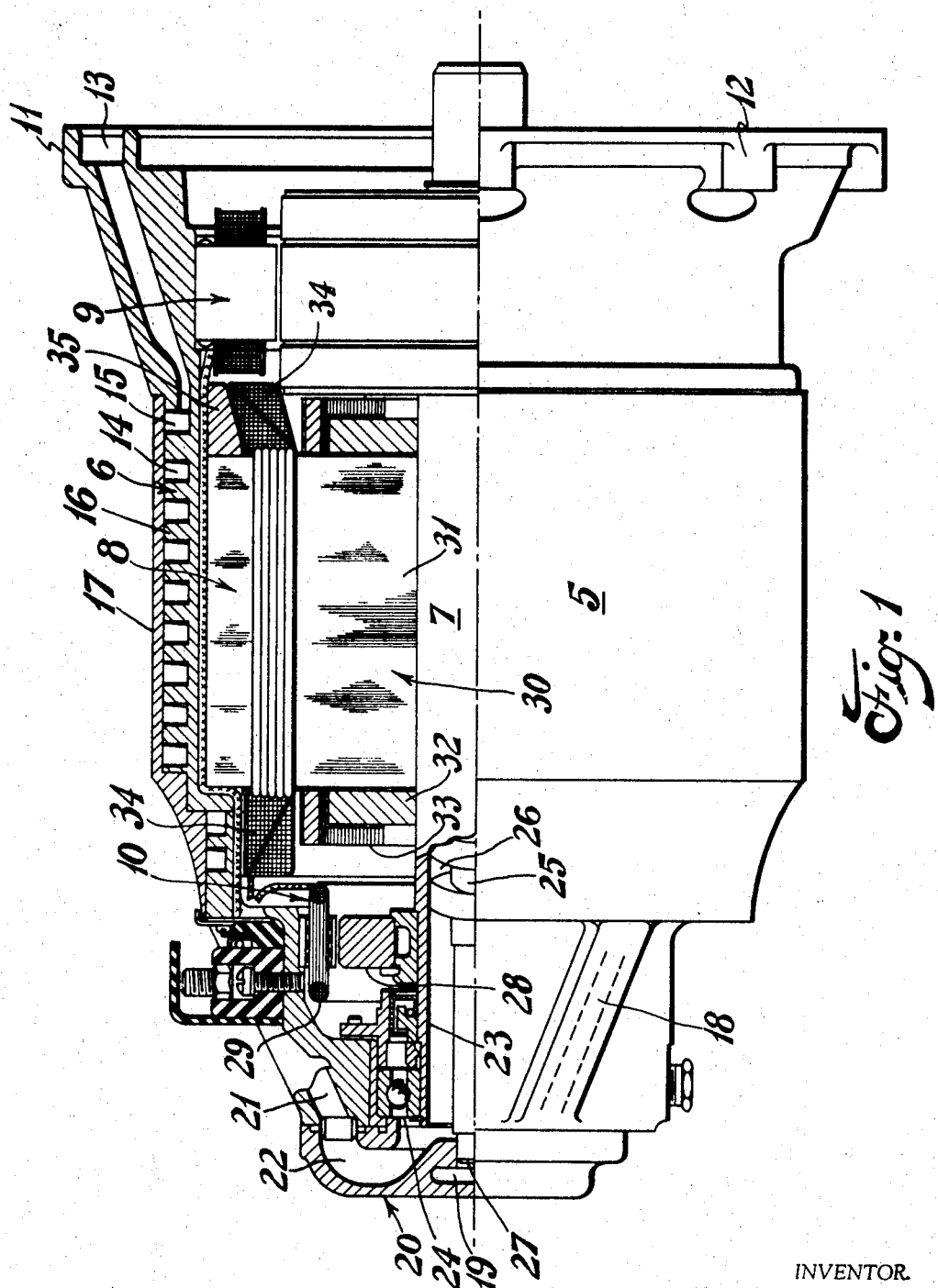
FIGURE 1 is a partial cutaway view of a dynamoelectric machine embodying the invention.

Referring now to the drawing, a dynamoelectric machine is indicated generally by the numeral 5 and as an example is a generator. The generator 5 has a housing 6 in which is mounted a rotor assembly 7 and for the purpose of illustration is shown as a brushless type having a main generator 8, an exciter 9 and a PM generator 10. The housing 6 includes a mounting flange 11 adapted for attaching the generator 5 to a prime mover (not shown). The flange 11 has a pair of diametrically opposite channels 12 and 13 which are adapted for connection to a supply of coolant, for example, the oil from a constant speed drive (not shown). The channels 12 and 13 connect to parallel spiral grooves 14 and 15, respectively, around the circumference of a section 16 of the housing 6. A cylindrical member 17 surrounds the section 16 and coacts with the section 16 to make the spiral grooves 14 and 15 into oil tight channels. The groove 14 is connected by a channel 18 to a channel 19 in end cap 20 and the groove 15 is connected by a channel 21 to a channel 22 in the end cap 20.

The rotor 7 includes an outer shaft 23 which is mounted by bearing 24 in the housing 6. Within the shaft 23 is an inner shaft member 25 having a spiral groove 26 extending around the circumference thereof and an axial opening 27 extending therethrough. The opening or channel 27 connects at one end with the channel 19 in the end cap 20 and at the other end to the spiral groove 26 which connects with the channel 22 in the end cap 20.

The PM generator 10 has a permanent magnet rotor 28 mounted on the shaft 23 adjacent to the bearing 24. An output winding 29 for the PM generator 10 is mounted in the housing 6 in operative relationship to the rotor 28. The generator 10 supplies excitation for the exciter 9 through a voltage regulator (not shown).

The main generator 8 has a rotor 30 mounted on the shaft 23 adjacent to the PM generator 10. The rotor 30 includes a stack of laminations 31 in intimate contact with the shaft 23. At each end of the stack of laminations 31 and in intimate contact therewith are heatsinks 32 of a material having good heat conductivity, for example, aluminum (see FIGURE 2). Field coils 33 are wound with the sides held tightly to the stack of laminations with the end turns around the heat sinks 32 and intimate contact therewith. The heat is conducted down through the laminations 31 and also down through the heatsinks 32 which are shrunk on the shaft for good heat transfer. The heat is then transmitted through the shaft 23 to the oil flowing therein. The main generator 8 also has a stator winding 34 secured in the housing 6 in operative relationship with the field winding 33. A heatsink 35 is provided between the windings 34 and the housing 6.

A heatsink 36 (see FIGURES 3 and 4) of a material having good heat conductivity, for example, aluminum is mounted on the shaft 23 adjacent to the rotor 30. Mounted around the circumference of the heatsink 36 are rotor laminations 37 for rotor 38 of the exciter 9. A winding 39 is provided on the laminations 37. Winding support rings 40 provide a heat path from the end turns of the winding 39 to the heatsink 36. The heatsink 36 has a plurality of recessed sections 41 adapted for mounting rectifiers 42 and suppresser resistors 43.

Connecting the rectifiers 42 in a 3 phase half wave configuration permits mounting directly on the heatsink 36.

The recessed sections 41 of the heatsink 36 are silver plated to provide good heat conductivity from the rectifiers 42 to the heatsink 36.

In operation, the cooling oil enters through the channel 12 in the mounting flange 11 to the spiral grooves 14 passing around the circumference of the section 16. From the grooves 14, the oil flows through the channel 18 to the channel 19 in the bearing cap 20. From the channel 19 the oil flows through the opening 27 in the shaft 25 and back through the groove 26 into the channel 22 where it lubricates the bearing 24. From the channel 22, the oil passes through the channel 21 into the grooves 15 and out through the channel 13.

The heatsinks 32 and 36 transfer the heat from the rotor windings to the oil flowing in the groove 26 in the shaft 23.

Although only one embodiment of the invention has been illustrated and described, various changes in the form and relative arrangement of the parts, which will now appear to those skilled in the art, may be made without departing from the scope of the invention.

What is claimed is:

1. A liquid-cooled generator comprising a housing, a rotor mounted in said housing, channels in said housing and in said rotor, means connecting said channel in said housing to said channel in said rotor to circulate a cooling fluid therein, a stator winding mounted in said housing, a heatsink positioned between and in intimate contact with said stator winding and said housing to conduct heat from the stator winding to the fluid, a winding on said rotor, and a heatsink on said rotor in intimate contact with said rotor winding to conduct heat from said rotor winding to the fluid.

2. The combination as set forth in claim 1 and including a cylindrical heatsink mounted on said rotor, an exciter rotor winding mounted on said cylindrical heatsink, and an exciter stator winding mounted in said housing in operative relationship with said exciter rotor winding.

3. The combination as set forth in claim 2 and including rectifiers mounted on said cylindrical heatsink.

4. The combination as set forth in claim 2 in which said cylindrical heatsink is aluminum.

5. The combination as set forth in claim 1 in which said rotor winding has end turns in intimate position with a pair of heatsinks on said rotor.

6. The combination as set forth in claim 2 in which said cylindrical heatsink has a plurality of recessed sections for mounting rectifiers, and said recessed sections being silver plated for good heat transfer.

References Cited

UNITED STATES PATENTS

| 3,293,461 | 12/1966 | Vemura et al. | 310—64 X |
| 2,524,269 | 10/1950 | Patterson | 310—54 |
| 2,891,391 | 6/1959 | Kocher et al. | 310—54 |
| 3,241,331 | 3/1966 | Endress | 310—54 X |
| 3,250,929 | 5/1966 | Maier | 310—64 X |
| 3,260,872 | 7/1966 | Potter | 310—54 |

FOREIGN PATENTS 647,316  6/1937  Germany.

MILTON O. HIRSHFIELD, *Primary Examiner.*

E. SUTTON, *Assistant Examiner.*

U.S. Cl. X.R.

310—64